United States Patent [19]

Abe et al.

[11] Patent Number: 4,792,345

[45] Date of Patent: Dec. 20, 1988

[54] CONTROL CIRCUIT FOR AN AIR CLEANER

[75] Inventors: Shuji Abe, Toyonaka; Toshiichiro Tanaka, Yokaichi; Nobuhiro Hayashi, Shiga; Katsunory Zaizen, Mino; Seiichi Ueno, Osaka, all of Japan

[73] Assignee: Matsushita Electric Industrial Co., Ltd., Kadoma, Japan

[21] Appl. No.: 95,592

[22] Filed: Sep. 10, 1987

[30] Foreign Application Priority Data

| Sep. 10, 1986 | [JP] | Japan | 61-213236 |
| Sep. 10, 1986 | [JP] | Japan | 61-213239 |
| Sep. 10, 1986 | [JP] | Japan | 61-213240 |
| Sep. 26, 1986 | [JP] | Japan | 61-228984 |
| Sep. 26, 1986 | [JP] | Japan | 61-228994 |
| Sep. 26, 1986 | [JP] | Japan | 61-228995 |
| Oct. 17, 1986 | [JP] | Japan | 61-247779 |
| Nov. 28, 1986 | [JP] | Japan | 61-284736 |

[51] Int. Cl.$^4$ .................................................. B01D 46/46
[52] U.S. Cl. .................................... 55/210; 55/270; 55/271; 55/274; 55/467; 55/DIG. 34
[58] Field of Search .................... 55/210–212, 55/270, 274, 271, 467, DIG. 34, 104, 106

[56] References Cited

U.S. PATENT DOCUMENTS

| 2,533,339 | 12/1950 | Willenborg | 55/210 |
| 3,237,375 | 3/1966 | Schwarz et al. | 55/106 X |
| 3,516,232 | 6/1970 | Gilbertson | 55/DIG. 34 X |
| 3,950,155 | 4/1976 | Komiyama | 55/DIG. 34 X |
| 4,119,419 | 10/1978 | Passaro et al. | 55/DIG. 34 X |
| 4,177,045 | 12/1979 | Orel | 55/DIG. 34 X |
| 4,244,712 | 1/1981 | Tongret | 55/271 X |

FOREIGN PATENT DOCUMENTS

| 81118 | 7/1981 | Japan | 55/274 |
| 172002 | 9/1984 | Japan | 55/270 |
| 147210 | 8/1985 | Japan | 55/274 |
| 147211 | 8/1985 | Japan | 55/274 |
| 147212 | 8/1985 | Japan | 55/274 |
| 2032825 | 5/1980 | United Kingdom | 55/467 |

Primary Examiner—Kathleen J. Prunner
Attorney, Agent, or Firm—Wenderoth, Lind & Ponack

[57] ABSTRACT

A control circuit for an air cleaner including a gas sensor, an ultraviolet sensor and a control circuit for performing an automatic operation of the air cleaner in response to the detection of outputs of the sensors. A predetermined number of electrical pulses from the ultraviolet sensor are observed by the control circuit during a first predetermined time period after the passage of a second predetermined time period from a point of time when an initial pulse from the ultraviolet sensor has been inputted to the control circuit, the control circuit identifies the predetermined number of the pulses as a drive signal for initiating the operation of the air cleaner.

10 Claims, 9 Drawing Sheets

CONTROL CIRCUIT FOR AN AIR CLEANER

BACKGROUND OF THE INVENTION

The present invention relates to a control circuit for an air cleaner which has a function of performing automatic operation by detecting the pollution of the air in a room by a sensor.

As shown in FIGS. 1 to 3, a known air cleaner includes a casing 1 in which an electric fan 2 is incorporated. Air introduced into the casing 1 from suction ports 3 formed on a front face of the casing 1 passes through a prefilter 4 and then, is ionized by an opposite electrode 5 and a discharge wire 6. Subsequently, after dust has been removed from the air by a filter 7, the air is discharged from an exhaust vent 8. A remote control unit 9 is detachably mounted on an upper portion of the casing 1 and includes operating switches 10 and display portions 11. Furthermore, a gas sensor 12 for detecting the pollution of the air in a room is incorporated in the remote control unit 9. When the known air cleaner is set to an automatic operation mode by one of the operating switches 10, a detection circuit 13 receives an output of the gas sensor 12 and then, a control circuit 16, which is connected to an operation circuit 15 and a power source 14 for supplying electrical power to the electric fan 2 and between the opposite electrode 5 and the discharge wire 6, makes a decision on an output of the detection circuit 13 so as to control the power source 14 and a display circuit 17. Namely, automatic operation of the known air cleaner is operated in such a manner that the power source 14 and the display circuit 17 are turned on and off if the gas sensor 12 has detected that the air in the room is polluted and clean, respectively. Meanwhile, reference numeral 18 denotes a power cord.

The known air cleaner of the above described arrangement has been disadvantageous in actual use due to the fact that only the gas sensor 12 is employed as a sensor. Namely, in the case of a main application of the known air cleaner, such as the cleaning of the air at the time of smoking, the known air cleaner does not start its operation until smoke particles and gaseous matter generated from cigarettes reach the gas sensor 12 through their diffusion in the room after the cigarettes have been lit, thereby inevitably resulting in the necessity of a waiting time. Furthermore, the known air cleaner has a drawback in that since a heater portion is usually incorporated in the gas sensor, a waiting time of several minutes is required before a stable output of the gas sensor is obtained through the stabilization of temperature of the heater portion with the result that automatic operation of the known air cleaner cannot be performed during the waiting time.

SUMMARY OF THE INVENTION

Accordingly, an essential object of the present invention is to provide a control circuit for an air cleaner which can be used efficiently through employment of a sensor of quick response, with substantial elimination of the disadvantages inherent in conventional air cleaners of this kind.

In order to accomplish this object of the present invention, a control circuit for an air cleaner embodying the present invention comprises: an ultraviolet sensor for outputting pulses therefrom; and a control circuit for performing automatic operation of said air cleaner in response to detection of said pulse output from said ultraviolet sensor; wherein, when a predetermined number of pulses are observed by the control circuit during a first predetermined time period after the passage of a second predetermined time period from a point of time when an initial pulse from said ultraviolet sensor has been inputted to said control circuit, then the control circuit identifies the predetermined number of the pulses as a drive signal from said ultraviolet sensor.

By the above described arrangement of the air cleaner according to the present invention, flames of a cigarette lighter, a match, etc. are immediately detected by the ultraviolet sensor, thereby enabling the start of the automatic operation of the air cleaner.

Furthermore, in accordance with the present invention, since the output of the ultraviolet sensor is identified as a signal from the flames or a malfunction signal on the basis of whether or not a predetermined number of pulses have been observed during a predetermined time interval, it becomes possible to use a sensor of quick response without malfunctioning of the sensor.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
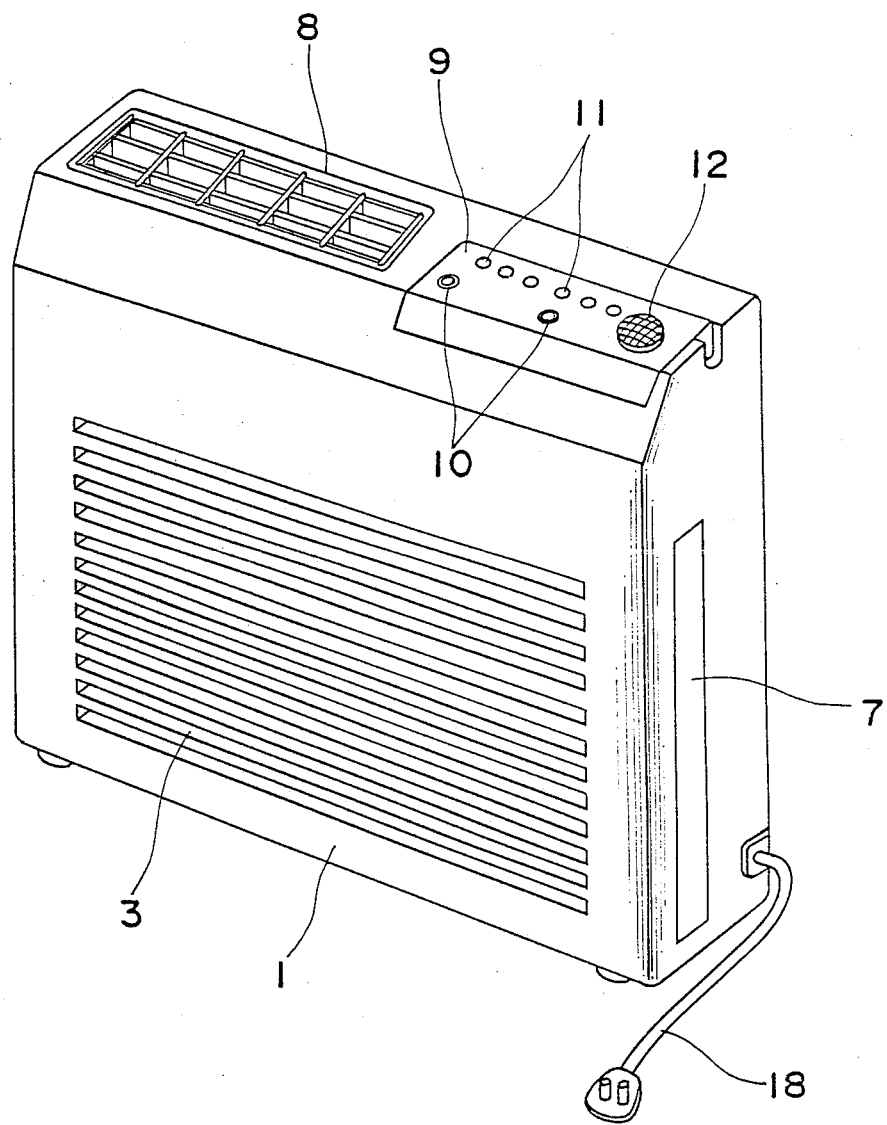
FIG. 1 is a perspective view of a prior art air cleaner (already referred to)
Figure 2:
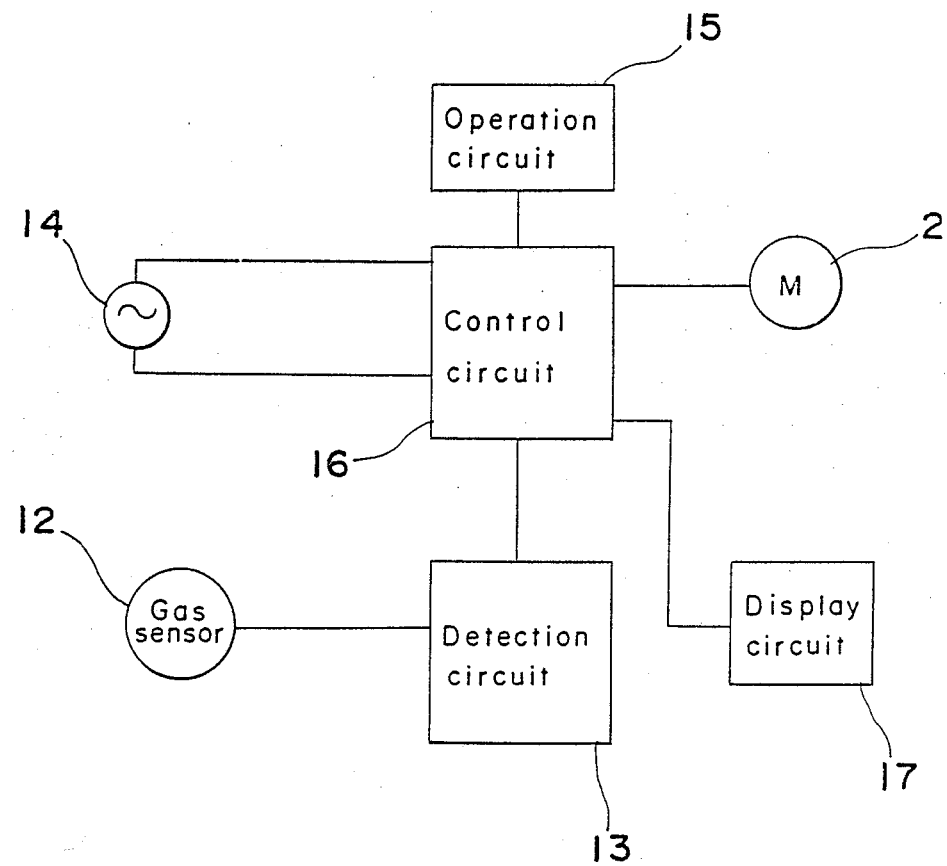
FIG. 2 is an electrical block diagram of the prior art air cleaner of FIG. 1 (already referred to)
Figure 3:
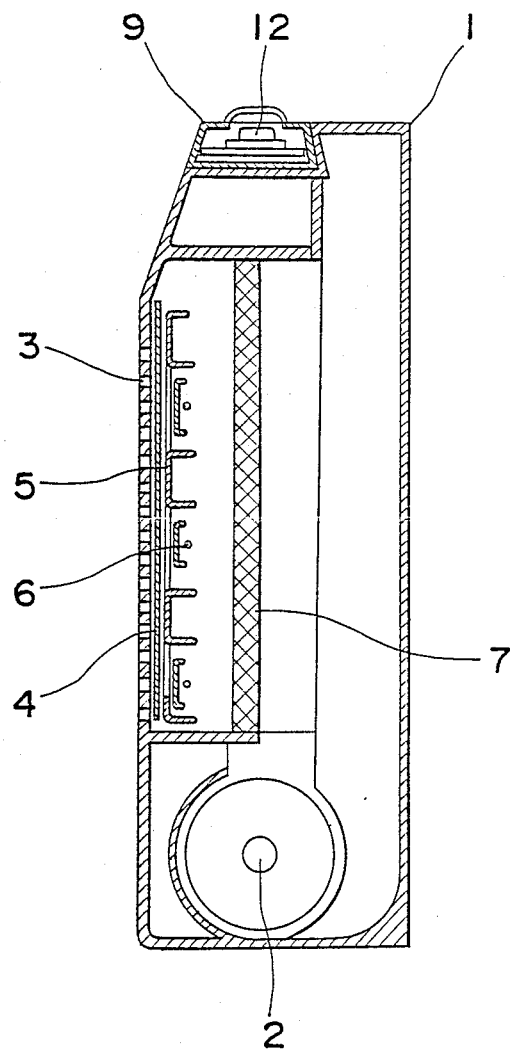
FIG. 3 is a sectional view of the prior art air cleaner of FIG. 1 (already referred to)
Figure 4:
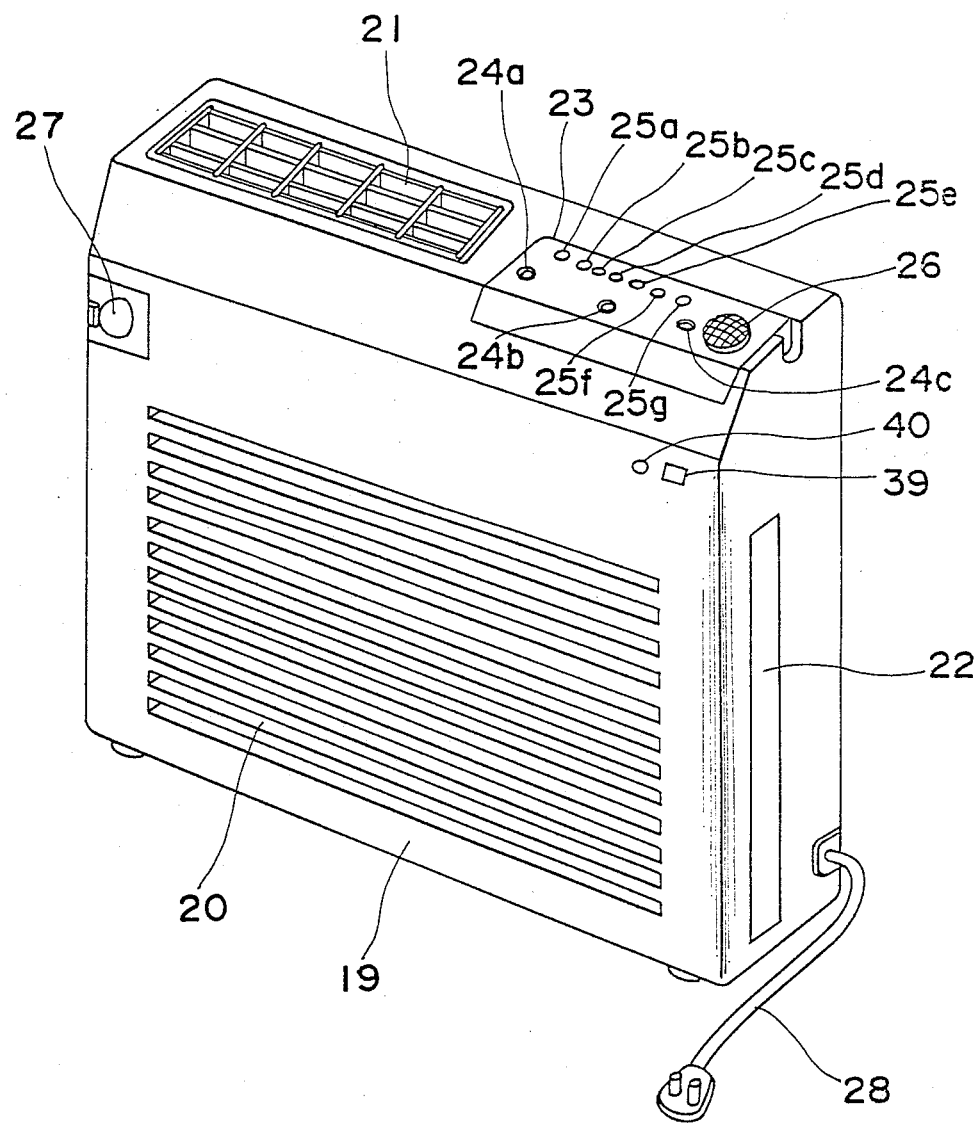
FIG. 4 is a perspective view of an air cleaner according to one preferred embodiment of the present invention.

Referring now to the drawings, there is shown in FIG. 4, an air cleaner according to one preferred embodiment of the present invention. The air cleaner includes a casing 19. Air is introduced into the casing 19 from suction ports 20 formed on a front face of the casing 19. After dust has been removed from the air by a filter 22 provided in the course of a flow path of the air, the air is discharged from an exhaust vent 21 provided on an upper face of the casing 19. An electric fan for generating an air flow is incorporated in the casing 19 so as to be disposed in the flow path between the filter 22 and the exhaust vent 21. The air cleaner further includes a remote control unit 23 detachably mounted on an upper portion of the casing 19. The electric fan 32 is also driven by manipulation of an air volume setting switch 24a provided on the remote control unit 23 so as to be set to a large air volume ("Strong"), an intermediate air volume ("Intermediate") and a small air volume ("Weak"), which are indicated by turning on display lamps 25a, 25b and 25c of the remote control unit 23, respectively. The remote control unit 23 incorporates a control circuit which performs automatic operation of the electric fan 32 in accordance with outputs from a gas sensor 26 and a ultraviolet sensor 27 through turning on of a display lamp 25d of the remote control unit 23 if the air volume setting switch 24a has been set to an automatic operation mode. The ultraviolet sensor 27, a filter displacement display means 40 for indicating need of replacement of the filter 22 and a resetting means 39 for resetting a count of a counter 38 after displacement of the filter 22 are provided on the front face of the casing 19. The counter 38 is provided for counting a time period of usage of the filter 22 at an interval of a preset time period of a timer 37. The counter 38 and a changeover means 24c for changing over the interval of the preset time period of the timer 37 are also incorporated in the remote control unit 23. The timer 37 can be set by a timer setting switch 24b to preset time periods of 1 hr., 2 hr. and 6 hr. which are indicated by display lamps 25e, 25f and 25g, respectively such that the electric fan 32 can be operated by the timer 37. Meanwhile, reference numeral 28 denotes a power cord.

Figure 5:
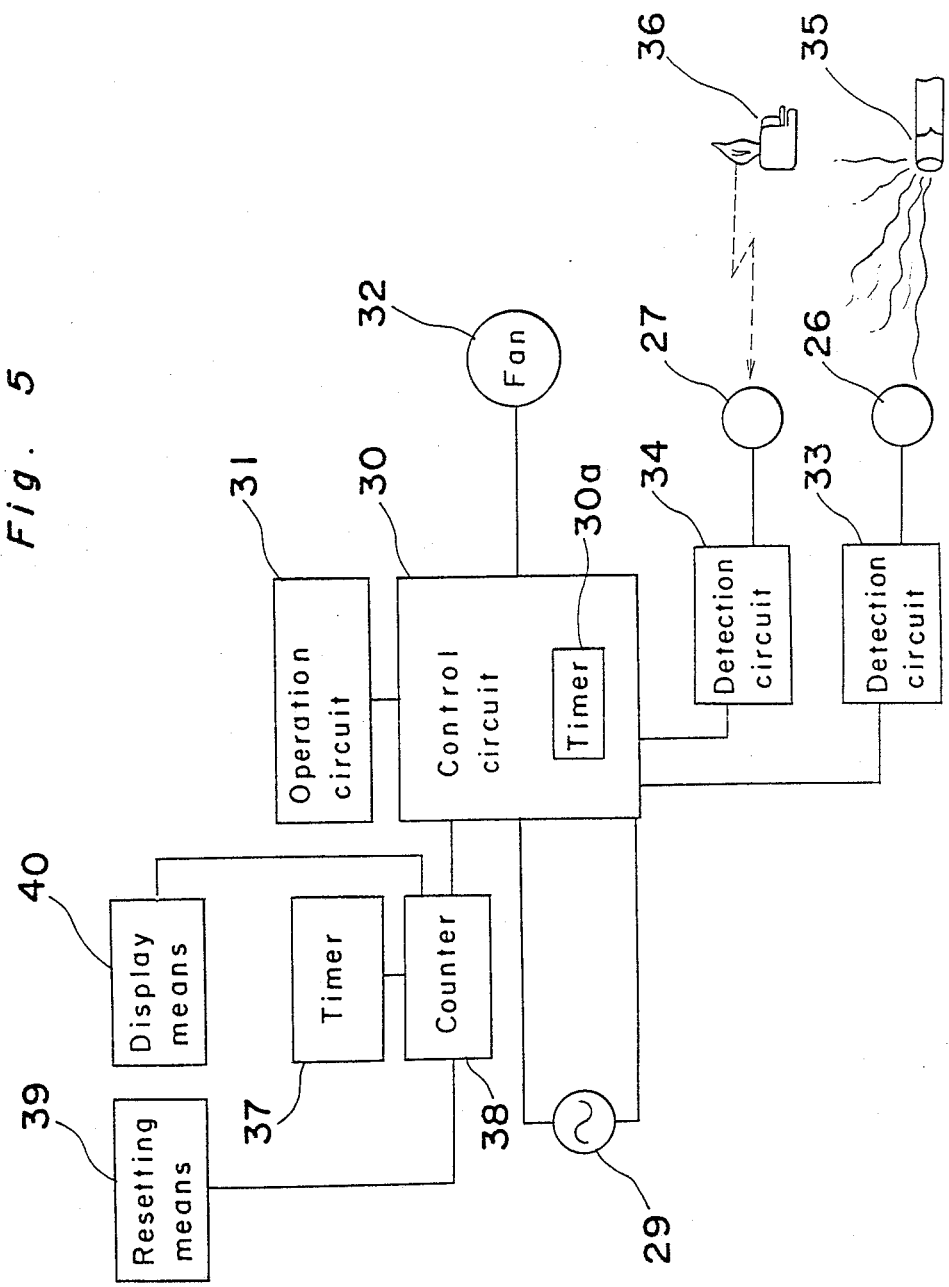
FIG. 5 is an electrical block diagram of the air cleaner of FIG. 4, which includes a gas sensor and a ultraviolet sensor.

The electrical circuit of the air cleaner is described with reference to FIG. 5. A control circuit 30 is connected to a power source 29 and drives the electric fan 32 in response to a signal from an operation circuit 31 including the air volume setting switch 24a and the timer setting switch 24b. In the case where the air volume setting switch 24a has been set to the automatic operation mode, an output from the gas sensor 26 is applied to the control circuit 30 through a detection circuit 33 and likewise, an output from the ultraviolet sensor 27 is applied via a detection circuit 34 to the control circuit 30 such that the control circuit 30 controls the automatic operation of the electric fan 32 in accordance with the outputs from the gas sensor 26 and the ultraviolet sensor 27. It is to be noted here that the gas sensor 26 is designed to mainly detect smoke, gaseous matter, etc. of a cigarette 35 at the time of smoking, while the ultraviolet sensor 27 is adapted to mainly detect flames, etc. of a cigarette lighter 36 for lighting the cigarette 35.

Figure 6A:
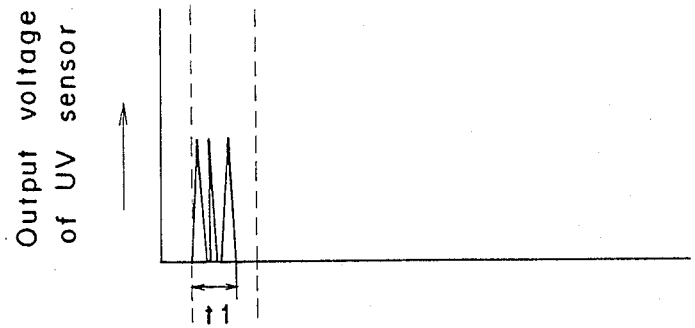
FIGS. 6A, 6B and 6C are graphs explanatory of output of the ultraviolet sensor of FIG. 5.
Figure 6B:
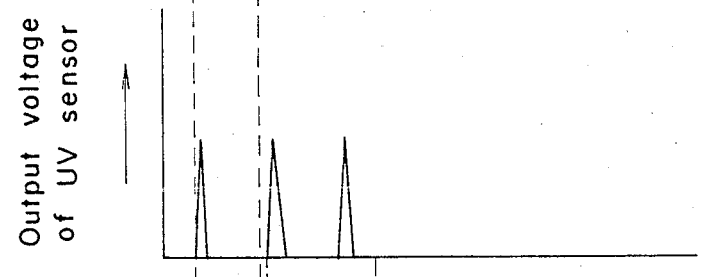
Figure 6C:
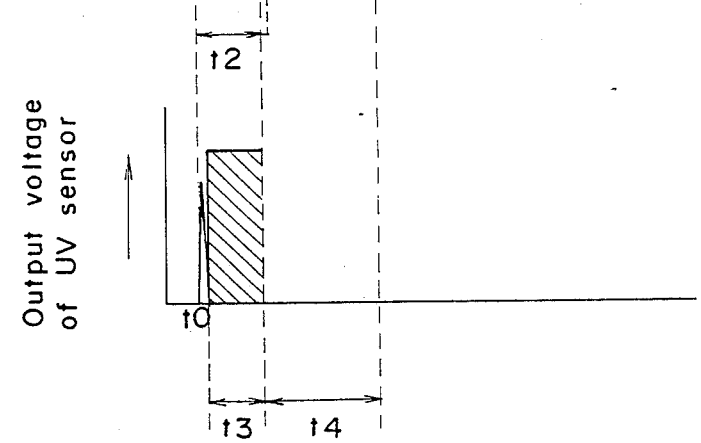

However, since the ultraviolet sensor 27 is so sensitive as to detect flames of the cigarette lighter 36, malfunctioning of the ultraviolet sensor 27 itself due to, for example, self-discharge, light of a fluorescent lamp, cosmic rays, etc. poses a problem in operation of the air cleaner. Thus, it becomes possible to prevent malfunctioning of the ultraviolet sensor 27 by the detection circuit 34 and the control circuit 30. In FIG. 6A which shows the output of the ultraviolet sensor 27 in the case of malfunctioning of the ultraviolet sensor 27, several pulses are generated during a short time period t1. In FIG. 6B which shows the output of the ultraviolet sensor 27 when the ultraviolet sensor 27 has detected flames of the cigarette lighter 36, etc., such a phenomenon frequently takes place in which several pulses are generated at an interval of a time period t2 longer than the time period t1. Therefore, in the present invention, it is so arranged as shown in FIG. 6C that signals generated during a waiting time t3 from a point t0 of time when an initial pulse has been generated are neglected and automatic operation of the electric fan 32 is started by output of the ultraviolet sensor 27 by detecting the number of pulses generated during a subsequent detection time period t4, i.e. the number of counting, which number has been found by experiments to be preferably set at 2 or 3. In FIG. 6C, the waiting time t3 is longer than the time period t1 and the detection time period t4 is longer than the waiting time t3. The present inventors have found that the waiting time t3 and the detection time period t4 are preferably set at approximately 10 msec. and 2 sec., respectively.

Operation of the above described air cleaner of the above described arrangement is described, hereinbelow. When a user lights the cigarette lighter 36 so as to start smoking after the air volume setting switch 24a has been set to the automatic operation mode, the ultraviolet sensor 27 immediately detects flames of the cigarette lighter 36. Thus, a signal from the ultraviolet sensor 27 is transmitted, through the detection circuit 34, to the control circuit 30, so that operation of the electric fan 32 is started. Hence, air in the room is introduced into the casing 19 from the suction ports 20 and then, is discharged from the exhaust vent 21, so that diffusion rate of smokes and gaseous matter of the cigarette 35 rises.

Figure 7A:
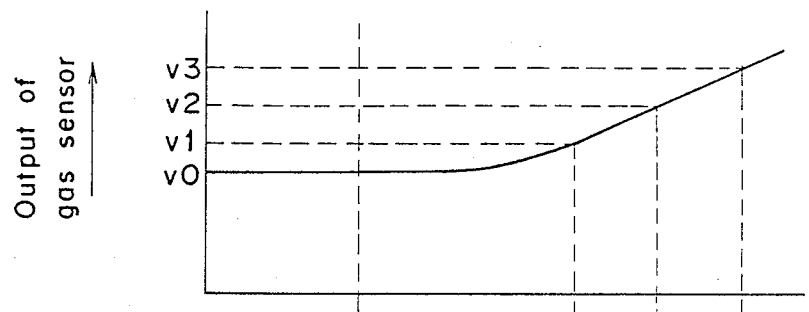
FIGS. 7A, 7B and 7C are timing charts of outputs of the gas sensor and the ultraviolet sensor of FIG. 5.
Figure 7B:
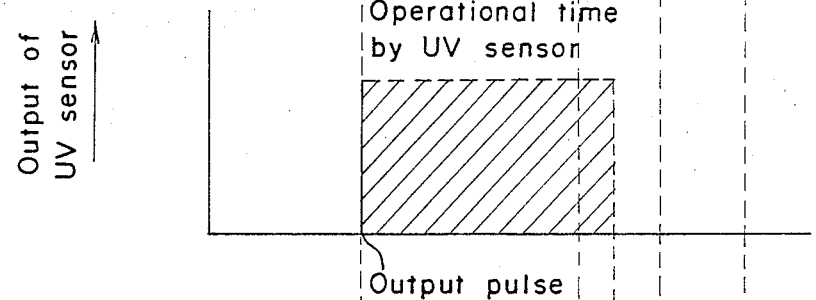
Figure 7C:
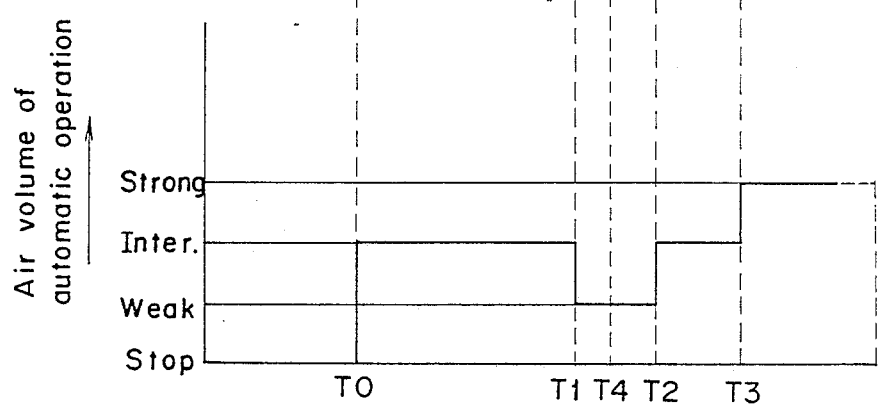

FIGS. 7A, 7B and 7C show operational states of the ultraviolet sensor 27 and the gas sensor 26. As shown in FIG. 7A, if the concentration of smoke of the cigarette 35 rises with the passage of time, the output of the gas sensor 26 changes in accordance with the concentration of smoke of the cigarette 35. Therefore, it is so arranged that output of the gas sensor 26 is variable according to the concentration of smoke of the cigarette 35. Namely, as the concentration of smoke of the cigarette 35 rises, the output of the gas sensor 26 is increased to v1, v2 and v3 at points T1, T2 and T3 of time, respectively relative to an output v0 obtained at the time when there is no smoke. Air volume in the automatic operation mode is, respectively, set to "Weak", "Intermediate" and "Strong" at the points T1, T2 and T3 by the air volume setting switch 24a.

Meanwhile, when flames are produced, the ultraviolet sensor 27 generates a pulse output in response to an ultraviolet component of the flames and does not output a pulse when the flames have been extinguished. Therefore, as shown in FIG. 7B, the ultraviolet sensor 27 is operated for a predetermined time period after a point of time of generation of a pulse. Since the ultraviolet sensor 27 is arranged to detect flames, it is impossible to determine to what extent air in the room is polluted subsequently. Thus, since loss of operation of the electric fan 32 is great if the electric fan 32 is operated at its full capacity, the electric fan 32 is operated by setting the air volume to the "Intermediate".

Furthermore, in FIG. 7B, an operational time of (T4−T0) of the electric fan 32 due to operation of the ultraviolet sensor 27 is set to a time period sufficient for gaseous matter in the smoke to reach the gas sensor 26, for example, 15 min. Priority is given to operation of the electric fan 32 due to operation of the gas sensor 26 at the point T1 of time over operation of the electric fan 32 due to operation of the ultraviolet sensor 27. Thus, the air cleaner starts operation simultaneously with start of smoking and then, the air cleaner is operated in accordance with concentration of produced gaseous matter detected by the gas sensor 26. A series of these operations of the air cleaner are performed continuously and thus, the user can obtain quick-response and efficient automatic operation of the air cleaner free from malfunctioning.

Meanwhile, the control circuit 30 includes a timer 30a for counting a predetermined time period in response to output of the ultraviolet sensor 27. During counting of the timer 30a, the air cleaner is operated. If a cigarette is lit again during operation of the air cleaner, this lighting of the cigarette is detected by the ultraviolet sensor 27 and this detection signal of the ultraviolet sensor 27 is outputted. Thus, the timer 30a is reset so as to count the predetermined time period from a point of time of resetting of the timer 30a.

Figure 8:
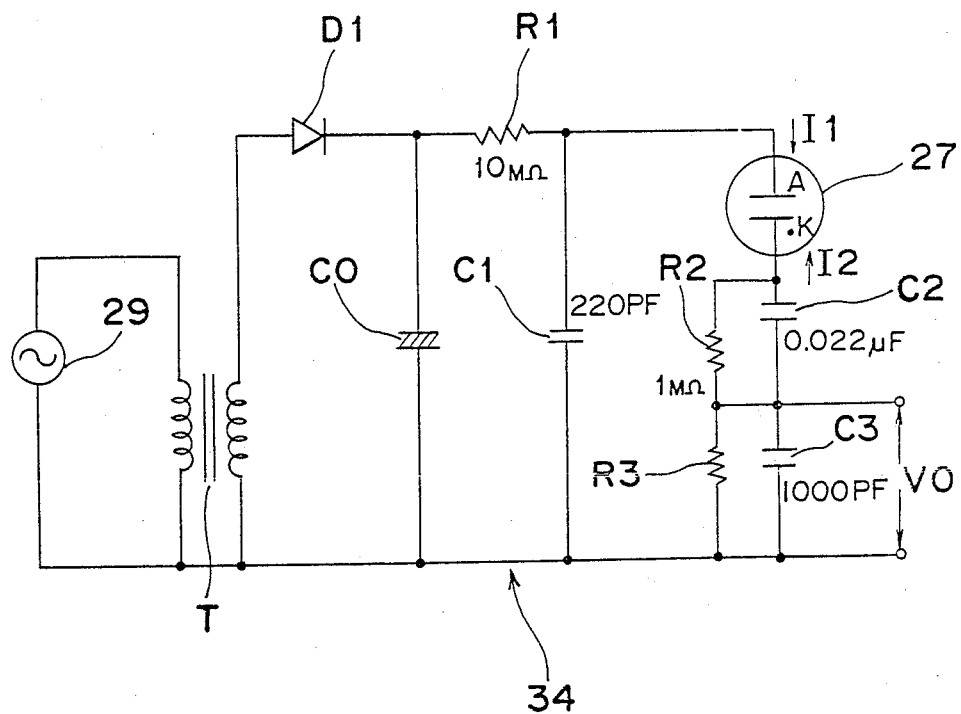
FIG. 8 is a circuit diagram showing a detection circuit of the ultraviolet sensor of FIG. 5.

FIG. 8 shows one concrete example of the detection circuit 34. Voltage of the power source 29 is raised by a transformer T. Electrical current is rectified by a diode D1 and smoothed by a capacitor C0 such that an electrical charge is accumulated on a capacitor C1 through a resistor R1. The ultraviolet sensor 27, a parallel circuit of a capacitor C2 and a resistor R2 and a parallel circuit of a capacitor C3 and a resistor R3, which are connected in series, are connected, in parallel, to opposite ends of the capacitor C1 such that an electrical potential V0 appearing between opposite ends of the resistor R3 is outputted to the control circuit 30.

The ultraviolet sensor 27 is required to be mounted on the casing 19 so as to be directed outwardly from the casing 19. Meanwhile, the ultraviolet sensor 27 is usually formed by a discharge tube constituted by a glass tube and should be made of material having a high transmittance for ultraviolet rays. Therefore, it is difficult to attach a protective cover to the ultraviolet sensor 27. Thus, if the ultraviolet sensor 27 is damaged, such a risk may arise in that the electrode is exposed. However, if the resistor R1 is set to 10 MΩ, the capacitor C1 is set to 220 PF, the resistor R2 is set to 1 MΩ, the capacitor C2 is set to 0.022 μF and the capacitor C3 is set to 1000 PF, an anode A and a cathode K of the ultraviolet sensor 27 have an impedance of not less than 5 MΩ and an impedance of not less than 100KΩ against a commercial power source, respectively, thereby preventing the danger of an electrical shock. At this time, a detection pulse generated by the ultraviolet sensor 27 has a period of about 10 μsec. Hence, the output V0 has an impedance of not more than 1 Ω against the cathode K of the ultraviolet sensor 27, so that the ultraviolet sensor 27 can generate a sufficiently large output.

Figure 9A:
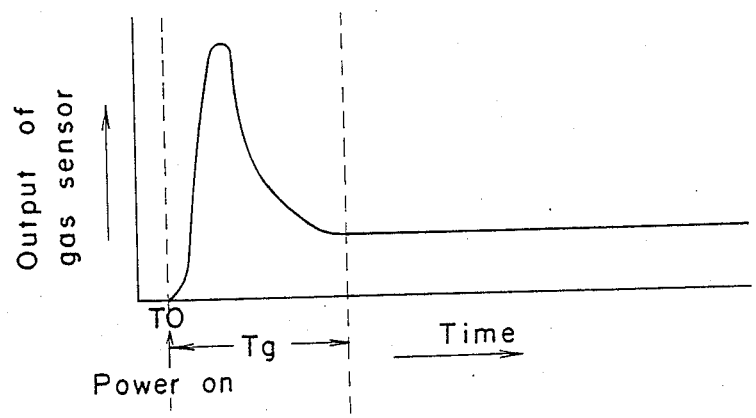
FIGS. 9A and 9B are timing charts of output of the gas sensor of FIG. 5 at the time of turning on a power source of the air cleaner of FIG. 4.
Figure 9B:
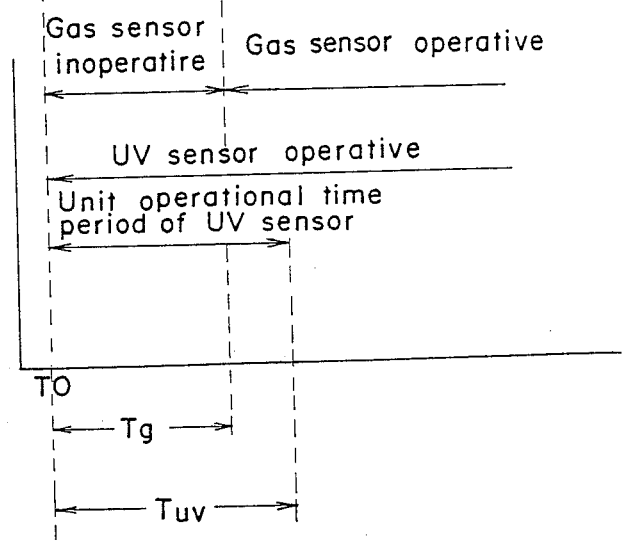

Meanwhile, as shown in FIG. 9A, the gas sensor 26 operates unstably during an inoperative time period Tg from a point T0 of time when the power source is turned on and therefore, the gas sensor 26 cannot be used during this inoperative time period Tg. Thus, this inoperative time period Tg is not given to the ultraviolet sensor 27 which can be used substantially simultaneously with turning on of the power source. Thus, if the ultraviolet sensor 27 detects ultraviolet rays during the inoperative time period Tg, operation of the ultraviolet sensor 27 is automatically continued during not less than a unit operational time period Tuv of the ultraviolet sensor 27 as shown in FIG. 9B. The unit operational time period Tuv is longer than the inoperative time period Tg and is set to, for example, 15 min. Therefore, before the automatic operation of the electric fan 32 due to the ultraviolet sensor 27 is operative, the automatic operation of the electric fan 32 due to the gas sensor 26 can be started. Accordingly, a series of automatic operations of the electric fan 32 due to smoking can be performed immediately after turning on of the power source, so that a quick-response automatic operation of the electric fan 32 can be sufficiently performed even immediately after turning on of the power source.

The filter 22 employed in the air cleaner of the present invention deteriorates in performance when a large amount of dust such as smoke of a cigarette has been adsorbed to the filter 22. Therefore, it is necessary to inform the user of the need of replacement of the filter 22 before performance of the filter 22 deteriorates excessively. Thus, when the air volume setting switch 24a has been set to the automatic operation mode, the display lamp 25d is turned on. Subsequently, when the gas concentration of air in the room rises, the control circuct 30 drives the electric fan 32 in response to an output from the gas sensor 26 and the speed of the electric fan 32, for example, one of "Strong", "Intermediate" and "Weak" is indicated by one of the display lamps 25a, 25b and 25c. The speed corresponding to "Strong", "Intermediate" and "Weak" are, respectively, rated as 3, 2 and 1. A maximum value of rating corresponding to the speed of the electric fan 32 during a predetermined time period set by the timer 37 is counted by the counter 38 and this counting of the counter 38 is repeated. When the count of the counter 38 has reached a predetermined value, the filter displacement display means 40 for indicating the need of replacement of the filter 22 is turned on.

Then, a case is described in which the electric fan 32 has been set to one of "Strong", "Intermediate" and "Weak" in a manual operation mode. When the air volume setting switch 24a has been set to the manual operation mcde, one of the display lamps 25a, 25b and 25c corresponding to the set speed of the electric fan 32 is turned on in the same manner as in the automatic operation mode. However, if a maximum value of rating corresponding to the speed of the electric fan 32 during a predetermined time period set by the timer 37 is counted by the counter 38 in the same manner as in the automatic operation mode, the gas concentration of air in the room may be inconsistent with the speed of the electric fan 32 set in the manual operation mode. Therefore, in the manual operation mode, the rise of the output of the gas sensor 26 is divided into several steps, for example, three steps A, B and C in a decreasing order. Then, 3, 2 and 1 are allotted to the steps A, B and C, respectively such that a maximum value of rating corresponding to the speed of the electric fan 32 during a predetermined time period set by the timer 37 is counted by the counter 38. As described above, in the manual operation mode, a maximum value of rating in a method different from that of the automatic operation mode is counted by the counter 38. Thereafter, when the count of the counter 38 has reached a predetermined value, the filter replacement display means 40 is turned on. A desired predetermined value can be selected by the changeover means 24c for changing over the predetermined value. Meanwhile, since it is so arranged that when not only the filter replacement display means 40 has been turned on but also the filter 22 has been replaced with a new one, the resetting means 39 is turned on so as to reset the count of the counter 38, and the time of replacement of the filter 22 can be indicated correctly.

As is clear from the foregoing description, in the present invention, since the ultraviolet sensor is employed, the automatic operation of the air cleaner can be started simultaneously with detection of the flames of a cigarette lighter, etc. at the time of the start of smoking. In the case where the ultraviolet sensor is used in addition to the gas sensor, an effect of decreasing a response time of the gas sensor is achieved. Furthermore, in order to detect an output of the ultraviolet sensor a waiting time is provided after the generation of an initial pulse and a decision as to whether or not the ultraviolet sensor is malfunctioning is made by counting the number of pulses generated during the subsequent detection time period.

Accordingly, in accordance with the present invention, the sensors are capable of performing reliable detection and it becomes possible to obtain an air cleaner having a function of a quick-response automatic operation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In an air cleaner having a casing, an air filter disposed within the casing and a fan disposed within the casing so as to generate air flow through the casing and filter, the improvement comprising:
   an ultraviolet sensor for outputting electrical pulses therefrom;
   and means for performing automatic operation of said fan in response to detection of said pulse output from said ultraviolet sensor said means including a detection circuit and a control circuit; said detection circuit being connected to receive pulses from said ultraviolet sensor and to transmit a signal to said control circuit; said control circuit being connected to said fan such that
   when a predetermined number of pulses are detected during a first predetermined time period after passage of a second predetermined time period from a point of time when an initial pulse from said ultraviolet sensor has been detected, then the control circuit identifies said predetermined number of pulses as a drive signal to initiate operation of the air cleaner.

2. An air cleaner as claimed in claim 1, further comprising:
   a gas sensor for detecting a degree of pollution of air in a room and the providing an electrical output in response to said degree of pollution; and a second detection circuit connected to receive the output from said gas sensor and to transmit a signal to the control circuit so as to initiate operation of the air cleaner.

3. An air cleaner as recited in claim 1;
   wherein opposite ends of said ultraviolet sensor are connected to a power source through a first parallel circuit and a second parallel circuit connected in series;
   said first parallel circuit including a first capacitor and a first resistor, while said second parallel circuit includes a second capacitor and a second resistor.

4. In an air cleaner having a casing, an air filter disposed within the casing and a fan disposed within the casing so as to generate air flow through the casing and filter, the improvement comprising:
   an ultraviolet sensor for outputting electrical pulses therefrom; and
   means for performing automatic operation of said fan in response to detection of said pulse output from said ultraviolet sensor, said means including a detection circuit and a control circuit; said detection circuit being connected to receive pulses from said ultraviolet sensor and to transmit a signal to said control circuit;
   said control circuit including a timer for counting a predetermined time period in response to said output pulses from said ultraviolet sensor;
   said control circuit being connected to said fan so as to operate said far during the counting of said predetermined time period of said timer and to reset said timer in response to a further output of said ultraviolet sensor so as to cause said timer to again begin to count the predetermined time period.

5. In an air cleaner having a casing, an air filter disposed within the casing and a fan disposed within the casing so as to generate air flow through the casing and filter, the improvement comprising:
   a gas sensor for detecting gaseous matter in a room and for providing an electrical output in response thereto;
   an ultraviolet sensor for detecting ultraviolet rays emitted from flames and for providing an electrical output in response thereto; and
   means for performing automatic operation of said fan on the basis of said outputs from said gas sensor and said ultraviolet sensor, said means including a control circuit connected to said sensors and to said fan;
   and wherein the control circuit includes means such that a time period for performing automatic operation of said fan in the case where said ultraviolet sensor has detected the ultraviolet rays is longer than a time interval required for the gaseous matter of a burning substance ignited by the flames to reach said gas sensor through diffusion of the gaseous matter.

6. An air cleaner as claimed in claim 5, wherein the time period is adjusted from outside of said air cleaner.

7. In an air cleaner having a casing, an air filter disposed within the casing and a fan disposed within the casing so as to generate air flow through the casing and filter, the fan being connected to an air volume setting switch, the improvement comprising:
   a gas sensor for detecting a degree of pollution of air in a room and for providing a variable electrical output in response thereto;
   an ultraviolet sensor for detecting a flame and for providing an electrical output in response thereto; and
   means for performing automatic operation of said fan in response to said output of said gas sensor by selecting an air volume setting corresponding to a level of said output of said gas sensor and in response to said output of said ultraviolet sensor at a constant air volume setting regardless of a level of said output of said ultraviolet sensor.

8. An air cleaner as claimed in claim 7, wherein said constant air volume setting is not a maximum air volume setting of said air cleaner.

9. In an air cleaner having a casing, an air filter disposed within the casing and a fan connected to a power source, said fan disposed within the casing to generate air flow through the casing and filter, the improvement comprising:
   a gas sensor; and an ultraviolet sensor;

said gas sensor being inoperative during a predetermined time period after turning on of a power source, while said ultraviolet sensor is operative substantially simultaneously with turning on of said power source;

wherein a minimum continuous operational time period of said air cleaner in response to detection of ultraviolet rays by said ultraviolet sensor is longer than the predetermined time period.

10. In an air cleaner having a casing, an air filter disposed within the casing and a fan disposed within the casing so as to generate air flow through the casing and filter, the improvement comprising:

a gas sensor for providing an electrical output therefrom;

an ultraviolet sensor for providing an electrical output therefrom; and means for performing automatic operation of said fan in response to said outputs from said gas sensor and said ultraviolet sensor, said means including a control circuit; and wherein the control circuit includes means such that while said air cleaner is operated by the control circuit in response to said output of said gas sensor, priority is given to operation of said air cleaner in response to said output of said gas sensor over operation of said air cleaner in response to said output of said ultraviolet sensor.

* * * * *